No. 884,847.  
PATENTED APR. 14, 1908.  
R. E. OSLIN.  
SKID HOLDER.  
APPLICATION FILED DEC. 20, 1907.

Witnesses  
Frank B. Hoffman  
R. M. Smith

Inventor  
Robert E. Oslin  
By Victor J. Evans  
Attorney

UNITED STATES PATENT OFFICE.

ROBERT E. OSLIN, OF WASHINGTON, GEORGIA.

SKID-HOLDER.

No. 884,847.  Specification of Letters Patent.  Patented April 14, 1908.

Application filed December 20, 1907. Serial No. 407,338.

*To all whom it may concern:*

Be it known that I, ROBERT E. OSLIN, a citizen of the United States, residing at Washington, in the county of Wilkes and State of Georgia, have invented new and useful Improvements in Skid-Holders, of which the following is a specification.

This invention relates to skid holders, the object of the invention being to provide a simple and effective skid holder especially designed for use at railway stations to assist in positioning and securely holding the skids or gang planks by means of which freight is transferred from a car to a platform and vice versa.

With the above general object in view, the invention consists in the novel construction, combination and arrangement of parts herein fully described, illustrated and claimed.

Figure 1:
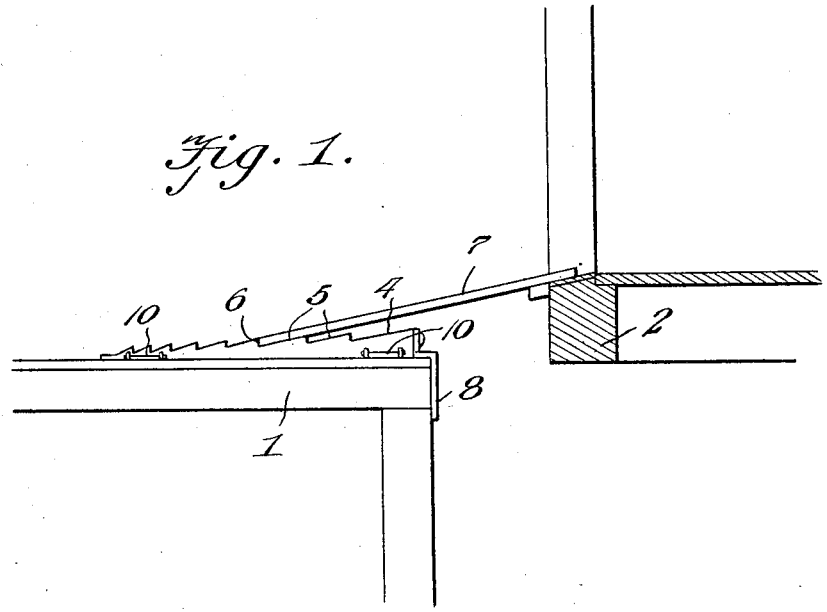
Figure 2:
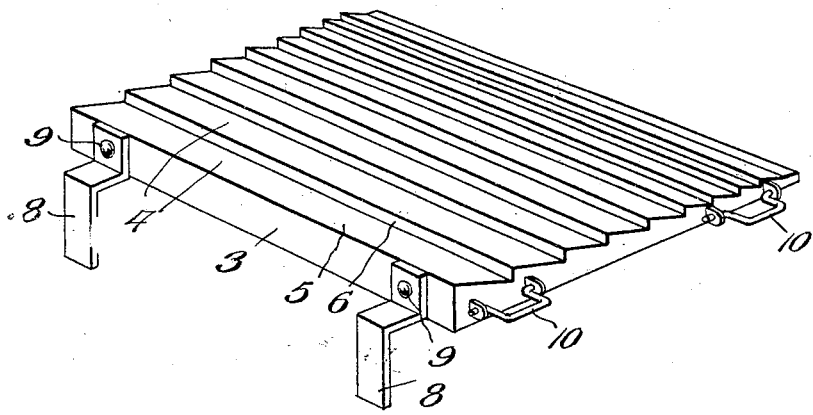

In the accompanying drawing:—Figure 1 is a side elevation of the skid holder illustrating the manner of using the same and showing a portion of a car and a platform with the skid in place. Fig. 2 is a perspective view of the skid holder.

The skid holder is of the form illustrated in Fig. 2, being preferably rectangular in plan and composed in the main of any suitable material such as metal or hard wood. The bottom of the holder is flat so as to rest directly on a platform as indicated in Fig. 1 in which 1 designates the platform and 2 designates a car adjacent to the platform. The upper surface of the skid holder indicated at 3 is shouldered or provided with any desired number of grooves or recesses 4 which extend across the upper face of the skid holder in parallel relation to each other. Each of said recesses or grooves comprises an inclined floor 5 and an abrupt and preferably undercut face 6 against which the edge of a skid or gang plank 7 is adapted to rest, the skid being supported by the inclined face or floor 5. As previously stated, any desired number of shoulders may thus be formed on the skid holder and they may be arranged at unequal intervals shown in Figs. 1 and 2 to provide for the necessary variation in length of the skids used in connection therewith. In order to prevent the skid holder from slipping on the platform, said holder is provided on its outer edge with downwardly extending stops 8 in the form of angle clips which are secured to the outer edge of the holder by fasteners 9 of any suitable description.

It is also preferred to provide the skid holder at opposite sides with handles 10 whereby the skid holder may be lifted and moved from place to place. The handles 10 are shown as folded, although it is not essential. After the car to be loaded or unloaded has stopped in front of the platform, the skid holder is moved to a position just in front of the door and placed on the platform in the manner shown in Fig. 1 with the stops 8 extending down in front of the edge of the platform. One end of the skid 7 is then rested on the door sill of the car while the other end is placed in engagement with the most convenient shoulder of the skid holder. The device thus absolutely prevents the skid from slipping, saving considerable time and annoyance to the train crew and avoiding the liability of expense which frequently occurs by reason of the skids slipping out of place.

It will be understood that the use of the device is not limited to cars and railway platforms and that it may be used on boats, wheeled vehicles and all kinds of conveyances.

I claim:—

A portable skid holder, adapted to rest on a horizontal platform and comprising a substantially rectangular body having a shouldered upper surface, and a stop projecting below one end of the body and adapted to overhang the edge of the platform to retain the skid holder adjacent to the edge of the platform.

In testimony whereof I affix my signature in presence of two witnesses.

ROBERT E. OSLIN.

Witnesses:
 C. S. LUCAS,
 P. G. LUCAS.